United States Patent
Hein et al.

(10) Patent No.: US 9,327,450 B2
(45) Date of Patent: May 3, 2016

(54) DEVICE AND METHOD FOR MANUFACTURING A THREE-DIMENSIONAL OBJECT BY MEANS OF AN APPLICATION DEVICE FOR BUILDING MATERIAL IN POWDER FORM

(75) Inventors: Peter Hein, Schäftlarn/Zell (DE); Frank Müller, München (DE)

(73) Assignee: EOS GMBH ELECTRO OPTICAL SYSTEMS, Krailling (DE)

( * ) Notice: Subject to any disclaimer, the term of this patent is extended or adjusted under 35 U.S.C. 154(b) by 798 days.

(21) Appl. No.: 12/311,585

(22) PCT Filed: Oct. 31, 2007

(86) PCT No.: PCT/EP2007/009479
§ 371 (c)(1),
(2), (4) Date: Apr. 3, 2009

(87) PCT Pub. No.: WO2008/055615
PCT Pub. Date: May 15, 2008

(65) Prior Publication Data
US 2009/0206522 A1    Aug. 20, 2009

(30) Foreign Application Priority Data
Nov. 10, 2006 (DE) .......................... 10 2006 053 121

(51) Int. Cl.
*B29C 35/08* (2006.01)
*B29C 67/00* (2006.01)
*B22F 3/105* (2006.01)

(52) U.S. Cl.
CPC ........... *B29C 67/0077* (2013.01); *B22F 3/1055* (2013.01); *B22F 2003/1057* (2013.01); *Y02P 10/295* (2015.11)

(58) Field of Classification Search
CPC ....................................................... B29C 35/08
USPC ............... 425/143, 174.4; 264/497, 460, 488, 264/482, 109, 112, 113, 123, 125
See application file for complete search history.

(56) References Cited

U.S. PATENT DOCUMENTS

| | | | |
|---|---|---|---|
| 5,647,931 A | 7/1997 | Retallick et al. | |
| 5,741,558 A * | 4/1998 | Otani et al. | 427/469 |
| 6,136,257 A | 10/2000 | Graf et al. | |

(Continued)

FOREIGN PATENT DOCUMENTS

| DE | 44 00 523 | 7/1995 |
|---|---|---|
| DE | 198 13 742 | 7/1999 |

(Continued)

*Primary Examiner* — Christina Johnson
*Assistant Examiner* — Xue Liu
(74) *Attorney, Agent, or Firm* — Locke Lord LLP; Scott D. Wofsy; Daniel J. Fiorello

(57) ABSTRACT

A device and a method for manufacturing a three-dimensional object (3) by solidifying layers (25) of a material in powder form at those positions corresponding to the respective cross-section of the object (3) are provided. The device comprises an application device (40) for applying layers of the material in powder form (47) in the building area (5), which can be moved over the building area (5). The application device (40) is formed to have a first longitudinal wall (41a) and a second longitudinal wall (41b) that are connected to one another via two side walls. The application device (40) is provided with a fluidization device for homogenizing the material in powder form (47). This fluidization device comprises at least one hollow body having escape openings in its walls, through which escape opening a gas can flow from the hollow body into the material in powder form (47).

15 Claims, 4 Drawing Sheets

(56) References Cited

U.S. PATENT DOCUMENTS

| | | | |
|---|---|---|---|
| 6,401,001 B1* | 6/2002 | Jang et al. | 700/118 |
| 6,672,343 B1* | 1/2004 | Perret et al. | 141/95 |
| 7,153,463 B2 | 12/2006 | Leuterer et al. | |
| 7,229,272 B2 | 6/2007 | Leuterer et al. | |
| 2005/0074550 A1* | 4/2005 | Leuterer et al. | 427/180 |
| 2007/0298182 A1 | 12/2007 | Perret et al. | |

FOREIGN PATENT DOCUMENTS

| | | |
|---|---|---|
| DE | 101 05 504 | 8/2002 |
| DE | 10 2005 016 940 | 10/2006 |
| DE | 10 2005 022 308 | 11/2006 |
| EP | 0 289 116 | 11/1988 |
| WO | WO-2006/122645 | 11/2006 |

* cited by examiner

DEVICE AND METHOD FOR MANUFACTURING A THREE-DIMENSIONAL OBJECT BY MEANS OF AN APPLICATION DEVICE FOR BUILDING MATERIAL IN POWDER FORM

The present invention is related to an application device for applying layers in powder form according to the preamble of claim 1 as well as to a device and a method for manufacturing a three-dimensional object.

Methods for manufacturing three-dimensional objects such as selective laser sintering or 3D printing are known. In these methods a three-dimensional object is manufactured layer-wise by means of a solidification of a material in powder form. In selective laser sintering the solidification is achieved by means of a laser beam incident onto the powder layer, wherein the method can be carried out also by means of other ionizing beams. In 3D printing a binder or glue is applied at those positions of the powder layer that are to be solidified.

In the above-mentioned methods a disadvantage may result from an agglutination of the powder already before the solidification process. Such an agglutination can occur already in a storage container due to attractive electrostatic forces between the powder particles. Furthermore, an agglutination process may be stimulated by the surrounding conditions when transporting the powder from the supply container to the building space, for example due to the elevated temperatures in the building space.

In DE 101 05 504 A1 a device and a method are described, in which powder is fluidized in a supply container by blowing air from below through the powder in the supply container. To this effect the supply container has a double bottom, wherein holes are provided in the upper part of this double bottom, through which holes the gas gets into the storage space of the powder.

The method according to DE 101 05 504 A1 may prevent an agglutination of the powder in the supply container, however, an agglutination after leaving the supply container before the application of the powder in the building space is still possible.

From EP 0 289 116 A1 a device and a method for manufacturing a three-dimensional object are known, wherein the object is manufactured layer-wise by melting of a powder material. The powder layers lying one upon the other are generated by means of a fluidized powder bed by stirring up the powder in the building space, in which the object is formed such that a new layer of powder respectively settles on a layer that has already been solidified by melting. In the process air is blown from below into the building space through a diffuser plate, whereby the powder is stirred up and at the same time areas of the part that have already been solidified are cooled.

When fluidizing the powder bed according to EP 0 289 116 A1 it is possible to stir up the powder and thereby prevent an agglutination immediately before the application process of a layer. However, the described method has disadvantages: On the one hand the air that is used for a stirring up of the powder escapes directly below the part to be manufactured so that the part to be manufactured may shadow the powder that is present above this part and only an incomplete stirring up occurs. On the other hand the cooling of the areas that have just been solidified by means of the supplied air may lead to stress and a warpage of the part.

The object of the present invention is to provide a device and a method, which make possible a more homogeneous powder application in a method for manufacturing a three-dimensional object.

The object is achieved by an application device according to claim 1, a method according to claim 7 and a method according to claim 9. Further developments of the invention are specified in the dependent claims.

Further features and advantages of the invention arise from the description of the embodiments based on the figures.

FIRST EMBODIMENT

Figure 1:
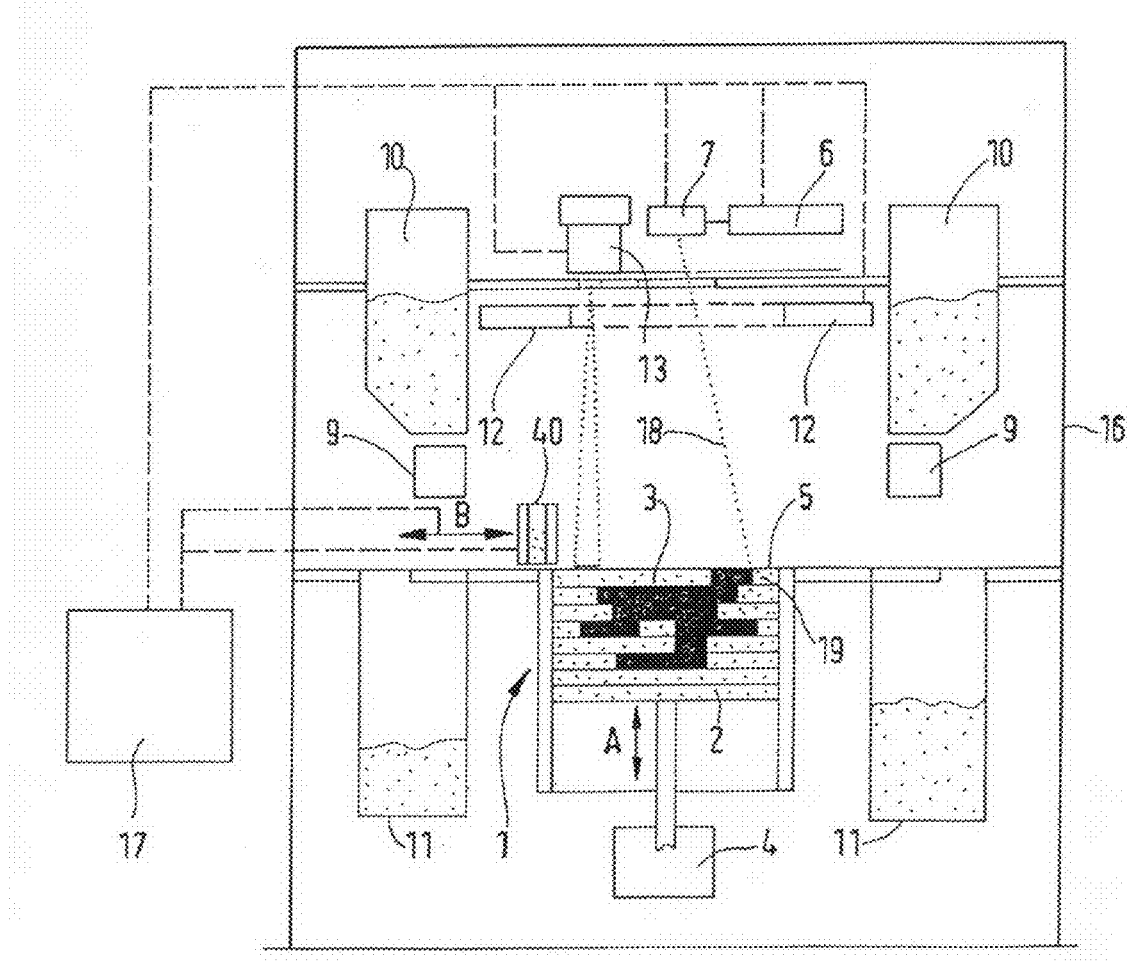
FIG. 1 shows a schematic view of an embodiment of a device for manufacturing a three-dimensional object.

FIG. 1 shows a laser sintering device as device for manufacturing a three-dimensional object according to the first embodiment. In the device of FIG. 1 the application device according to the invention and the method according to the invention are used. The building process takes place in a container 1, which is open to the top. A support 2 for carrying the three-dimensional object 3 to be formed is provided in the container.

The support 2 can be moved up and down in a vertical direction A in the container 1 by means of a drive 4. The upper edge of the container 1 defines a building area 5. An irradiation device 6 in the form of a laser is arranged above the building area 5. The irradiation device 6 emits a directed laser beam 18 that is steered onto the building area 5 by means of a deflection device 7. Moreover, an application device 40 for applying a layer of a material in powder form that is to be solidified onto the surface of the support 2 or onto a most recently solidified layer is provided. The application device (or recoater) 40 can be moved back and forth over the building area 5 by means of a drive that is schematically indicated by the arrows B. The application device is fed from two powder supply containers 10 by means of two dosage devices 9 at the left and at the right of the building area. Moreover, two overflow tanks 11 are provided at the left and at the right of the building area, which overflow tanks may receive the overflow powder that is accumulated in the application process.

Advantageously the device has in addition a heating device 12 arranged above the building area 5 for heating the powder bed 19 and particularly for pre-heating a powder layer that has been applied but not yet sintered (solidified) up to a work temperature $T_A$ suitable for the sintering. The heating device 12 for example is implemented as one or more radiant heaters (such as infrared radiators). The heating device 12 is arranged above the building area 5 in such a way that the applied powder layer can be uniformly heated.

Also, a temperature measuring device 13 such as a pyrometer or an infrared camera is advantageously provided at a distance above the building area 5. By such a temperature measuring device 13 the temperature of the most recently applied powder layer can be measured.

Depending on the type of the powder that is used it is advantageous to seclude the building area from the surrounding by a process chamber 16. Thereby, the building process can be performed under exclusion of air and an oxidation of the powder can be prevented.

An open loop and/or closed loop control device 17 serves for an open loop control and/or closed loop control of the movement B of the application device. The control device also controls the movement A of the support 2, the power of the heating device 12, the power of the irradiation device 6 and the deflection of the deflection device 7. To this effect the open loop/closed loop control device 17 is connected to the drive of the application device 40, to the drive 4, to the heating device 12, to the temperature measuring device 13, to the deflection device 7 as well as to the irradiation device 6.

In the following the operation of the laser sintering device is described:

At first the application device 40 is located beneath the dosage device 9 and is filled from the supply container 10 with the amount of material in powder form for one layer.

Then, a powder layer 25 is applied on the support 2 or a previously solidified layer 26 by moving the application device 40 in parallel to the surface of the building area 5. In the process there is a continuous flow of the material in powder form 47 from the application device.

After the application of a layer 25 of the material in powder form 47 the solidification is carried out at those positions of the layer 25 that correspond to the cross-section of the object by exposing the layer to the laser beam 18 in a way known as such.

It is of particular importance for the quality of the finished object that the temperature of the uppermost powder layer to be solidified is a temperature within a certain process window. For temperatures above the process window the powder is already sintered without additional radiation energy, whereas at temperatures below the process window stress may occur in the solidified layer. The so-called curl effect, where the edges of the solidified layer are bending up and rolling up, respectively, is often attributed to a temperature of the uppermost powder layer that is too low. Therefore, the powder layer 25, which has been applied with the application device, before the solidification has to be heated by the heating device 12 up to a work temperature $T_A$ within the process window and then has to be kept within the process window during the solidification in order to achieve good results.

To this effect, after the application of the powder layer the temperature of this layer is measured by means of the temperature measuring device 13. Depending on the temperature measured in this process, the heating power of the heating device 12 is set. When the uppermost powder layer has been heated up to the work temperature $T_A$, those positions in the layer of the building material that correspond to the cross-section of the object are solidified by irradiating them with the laser 6.

After the solidification of a layer the support 2 is lowered by a distance corresponding to the layer thickness d and the previously described steps are repeated until the manufacturing of the three-dimensional object 3 is complete.

Figure 2:
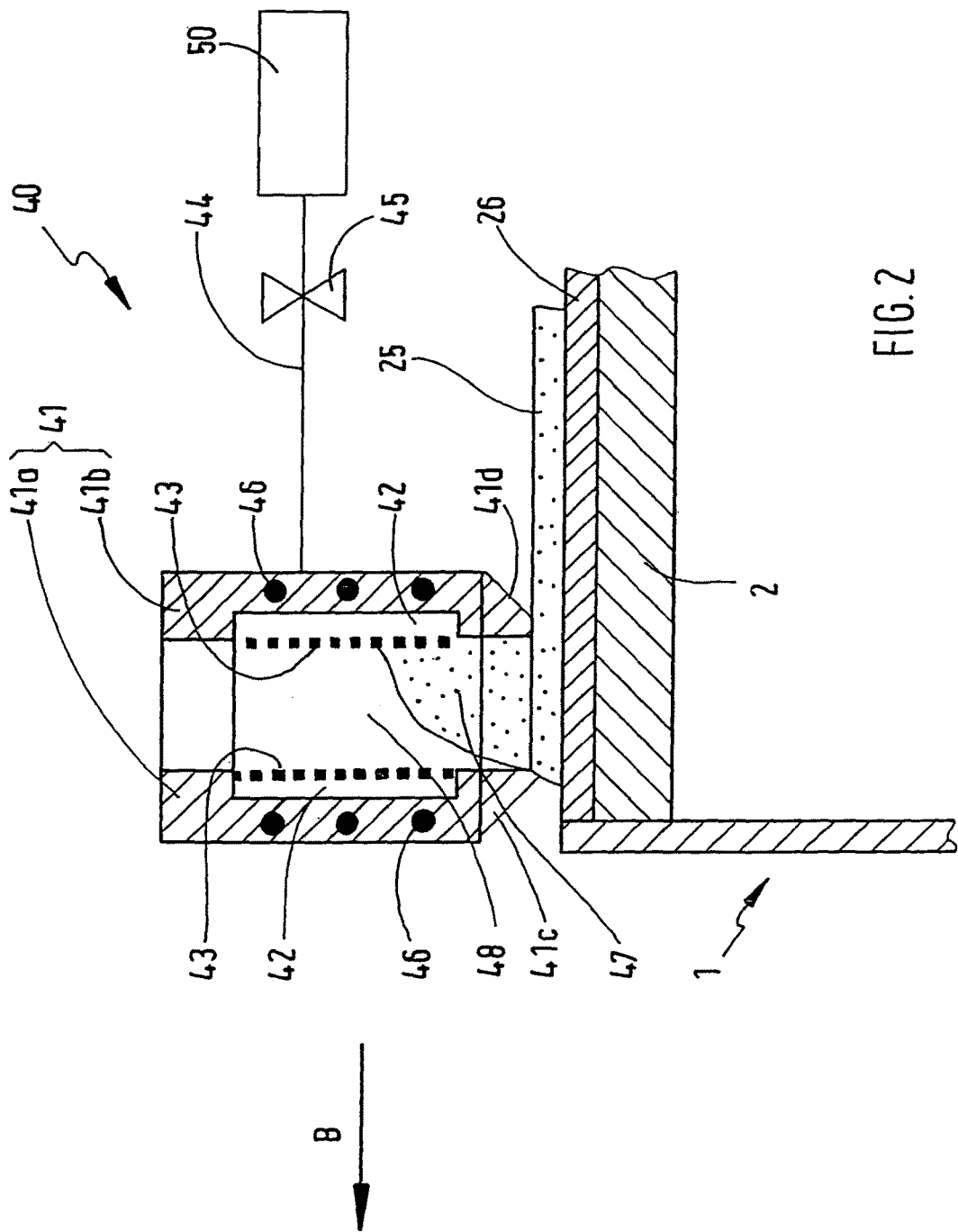
FIG. 2 shows a schematic cross-sectional view of an application device of a first embodiment of the invention.

FIG. 2 shows a first embodiment of an application device 40 that is used in the device for manufacturing a three-dimensional object according to the invention and that serves for applying layers of the material in powder form.

The application device has a first longitudinal wall 41a and second longitudinal wall 41b, which are rigidly connected to each other via side walls that are not shown. Here, those sides of the application device are regarded as longitudinal sides, which are substantially transverse to the direction of movement (indicated by the arrow B in FIG. 1). Advantageously the first longitudinal wall 41a and the second longitudinal wall 41b are in parallel to each other. However, this is not mandatory. A doctor blade 41c is attached at the bottom end of the first longitudinal wall 41a and a doctor blade 41d is attached at the bottom end of the second longitudinal wall 41b.

The blades 41c and 41d serve for a levelling of the powder layer to be applied. Preferably they are made from a rigid material, in particular metal, a heat-resistant plastic or a ceramics, like the walls. The first longitudinal wall 41a, the second longitudinal wall 41b and both side walls that are not shown together form a supply chamber 48 that is open to the top and to the bottom. The supply chamber 48 serves for receiving the material in powder form for a layer. A fluidizing device is integrated into the first longitudinal wall 41a and into the second longitudinal wall 41b, respectively. The fluidizing device consists of a pre-chamber 42 and a fluidization wall 43. A feed line 44 having a valve 45 is provided for letting a fluid medium such as nitrogen gas into the pre-chambers 42. The fluidization wall 43 has many small openings having a diameter that is smaller than the diameter of the particles of the material in powder form, so that the nitrogen gas may escape from the pre-chamber 42 through the fluidization wall 43, however, no material in powder form 47 can get into the pre-chamber 42.

The fluidization wall 43 can be a metal sheet having openings. It is also conceivable to form the fluidization wall 43 from a rolled wire mesh or from sintered plastic material. Moreover, the fluidization wall 43 may also consist of a gas-permeable composite material, in which metal or ceramics particles are held together by means of a binder such as a polymer.

In operation an overpressure is generated in the pre-chambers 42 by opening the valve 45 and letting nitrogen gas into the pre-chambers 42 via the feed line 44. This overpressure causes an escape of nitrogen from the openings in the fluidization walls 43. By the fluidization of the powder the flowability of the powder and thereby the quality of the applied layer may be improved.

The presence of a device 50 for an open loop control and/or closed loop control of the pressure and/or the flow rate of the fluid medium is particularly advantageous.

One reason for this is that a fluidization of the powder is not necessary, when the application device is not located above the building area 5. The inflow of the fluid medium or gas can then be adjusted by means of the open loop/closed loop control device depending on the position of the application device.

Furthermore, a high pressure and a high flow rate are advantageous for a homogenizing and mixing of the powder in the application device that are as complete as possible. However, in particular when the amount of powder in the application device decreases, it may be advantageous to reduce pressure and flow rate in order to guarantee a controlled discharge of the powder from the application device.

In order to adjust the gas flow to the application device the open loop/closed loop control device either may directly access the valve 45 or else may limit the gas flow to the valve 45.

The filling level in the application device may be supervised by means of a filling level sensor in the application device, which filling level sensor communicates a corresponding filling level information to the closed loop control device 50.

Of course, the closed loop control can also be effected depending on other parameters such as the temperature.

In particular, it is not necessary to bring the fluid medium that is used for the fluidization to a higher temperature than that of the powder to be fluidized in order to improve the powder homogeneity.

However, a pre-heating of the powder before the application has the advantage that the building time for manufacturing the three-dimensional object may be substantially reduced, because the heating-up time for the newly applied layer can be avoided or at least substantially reduced. Furthermore, a pre-heating of the powder before the application makes it possible to achieve a uniform heating of the powder layer to be applied. In case only the heating device 12 was used for a heating of the applied powder layer, the radiation, which is introduced for example by means of a radiant heater, would be possibly reflected, so that a temperature gradient could appear in the applied powder layer and there was the danger of over-heating at the surface. Furthermore, for a uniform heating obstacles between the radiant heater and the powder layer have to be avoided under all circumstances. Finally, by a pre-heating of the powder large temperature differences between the applied powder layer and the powder bed that is already present can be avoided and thereby undesired thermal effects can be avoided and the process window can be extended.

Due to the just mentioned advantages the application device according to the invention may be provided with a device for pre-heating the powder in the application device. To this effect for example a heating device 46 such as a resistance heating can be integrated in the application device. Moreover, also any other heating device, by which those parts of the application device that get into contact with the material in powder form can be heated, is conceivable. For instance, the application device may be selectively heated by a radiant heater or by heat media that flow through the walls of the application device.

SECOND EMBODIMENT

Figure 3:
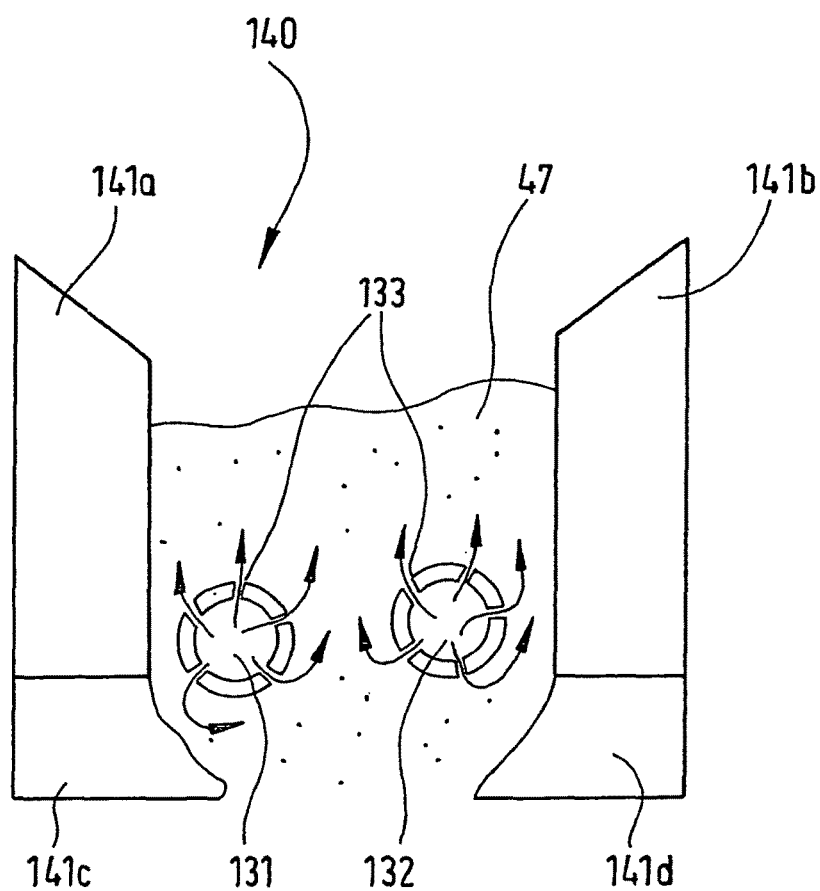
FIG. 3 shows a schematic cross-sectional view of an application device according to a second embodiment of the invention.
Figure 4:
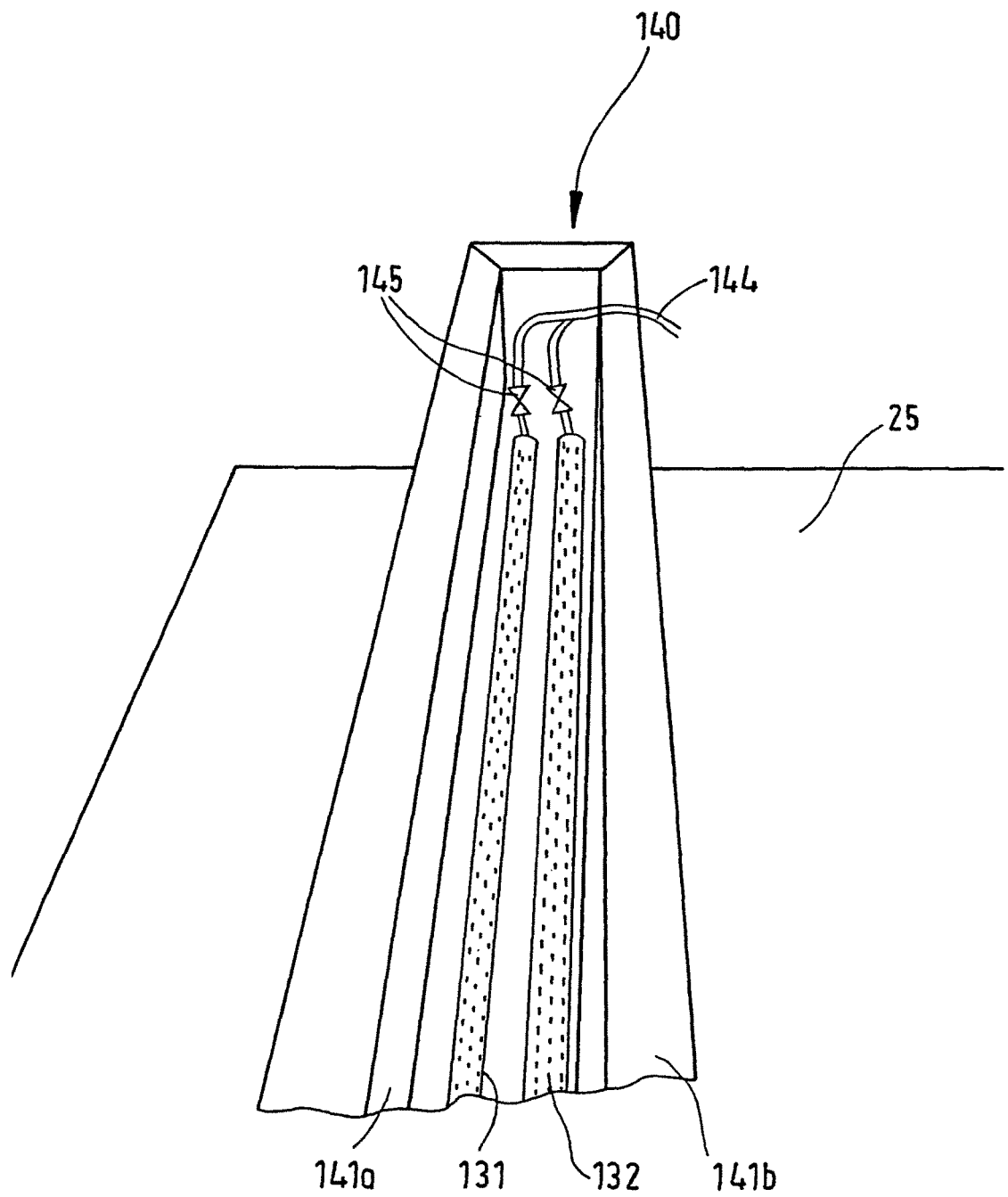
FIG. 4 shows an oblique top view of the application device according to the second embodiment.

FIGS. 3 and 4 show a cross-sectional view and a slanted top view, respectively, of an application device according to a second embodiment.

In the application device according to the second embodiment the fluid medium for a powder fluidization is not introduced via pre-chambers 42 in the walls of the application device. Instead, in the lower half of the application device between the first longitudinal wall 141*a* and the second longitudinal wall 141*b* there are pipes 131, 132 in parallel to them. The walls of the pipes 131, 132 are provided with openings 133 that are dimensioned such that their dimension is so small that no powder particles may enter the pipes. The fluid medium is fed to the pipes 131, 132 at their respective face ends via feed lines 144. In each of the feed lines 144 a valve 145 is provided as it was the case in the first embodiment. Further, not described details are identical to embodiment 1. In particular, this also applies to possible modifications of the application device such as the provision of an open loop/closed loop control device for the pressure and/or flow rate of the fluid medium. Moreover, the walls of the pipes 131, 132 may be made of the same material as the fluidization wall 43 in the first embodiment.

In the application device according to the second embodiment the devices for the feeding of the fluid medium 131, 132 are arranged in the lower region of the application device. As due to gravity the powder falls downwards, by this arrangement a better mixing is possible. As before the discharge from the application device the powder particles pass the pipes 131, 132, a better collection of the whole powder supply by the fluidization device is possible. Contrary to embodiment 1, where in the upper region of the pre-chambers 42 with ongoing discharge of the powder the escaping fluid medium no longer hits the powder, in the second embodiment it is always guaranteed that the medium hits the powder particles, because the pipes are arranged in the lower region of the application device.

Due to the possibility for an advantageous arrangement of the escape openings 133 for the fluid medium it is possible to reduce the amount of the fluid medium that is used, because the fluid medium is efficiently used.

In particular, the openings 133 need not be distributed uniformly on the walls of the pipes 131, 132. For instance, the openings 133 may be arranged only in the upper halves of the pipes, which means at those sides of the pipes that are facing away from the powder bed layer 25.

Furthermore, it is of course possible to choose instead of the pipe shape any other shape. The only boundary condition is that it must be a hollow body through which the fluid medium can flow and which has escape openings for the fluid medium in its wall. For instance, a plurality of such hollow bodies may be provided equidistantly and crosswise to the direction of movement B of the application device.

Further Modifications

The invention was described for a laser sintering device, in which a laser was used as radiation source. Any other radiation source, by which electromagnetic radiation or particle radiation can be introduced into the building material in powder form, is possible. Thus, e.g. a radiation source for incoherent light radiation, for infrared radiation for X-ray radiation or for electron beams can be used. Accordingly, a building material in powder form has to be used that can be solidified with the corresponding radiation.

In the described devices, an infrared radiator above of the building area is suggested as heating device 12 for the pre-heating of an already applied layer. Other possibilities for heating the most recently applied layer of building material are conceivable. For instance, the circulation of warm air or nitrogen may be used for pre-heating the applied layer, wherein said warm air or said warm nitrogen is directed over the freshly applied layer.

In each case the application device has been described as having a supply chamber. However, it is also possible to split the supply chamber into several chambers and implement thereby a spatially resolving application device. In doing so the different chambers may be filled separately with different materials in powder form.

The supplied fluid medium is not limited to a gas such as pressurized air or nitrogen. For instance, by means of the fluidization the powder in the application device can be moistened or subjected to a chemical treatment.

Though in the description a device for manufacturing a three-dimensional object has been described, in which a fluidization of the building material in powder form occurs in the application device, it is of course also possible to additionally fluidize the powder at other positions in the device such as in the supply container or the dosage device.

Though in the above description possibilities of pre-heating the powder in the application device have been described, a pre-heating at other positions such as in a supply container or in the dosage device is of course also possible.

The invention claimed is:

1. A device for manufacturing three-dimensional object by solidification of layers of a powder material at those positions corresponding to the respective cross-section of the object, said device including:
    an application device for applying powder in layers, the application device being movable over a building area and having:
    a first longitudinal wall and a second longitudinal wall that are connected to one another via side walls so as to form a supply chamber having a longitudinal direction substantially transverse to a direction of movement of the application device, said first and second longitudinal walls being substantially longer than said side walls, a device for fluidizing the powder material by means of a fluidizing gas that is fed to the application device, and a device for an open loop and/or closed loop control of the pressure and/or the flow rate of said fluidizing gas, the device for manufacturing three-dimensional object further comprising an irradiation device for irradiating powder for solidification of the powder material.

2. The device for manufacturing three-dimensional object according to claim 1, in which the device for fluidizing the powder material comprises at least one hollow body having a wall and gas escape openings in the wall, and gas flows through the hollow body.

3. The device for manufacturing three-dimensional object according to claim 2, in which the hollow body has a pipe shape.

4. The device for manufacturing three-dimensional object according to claim 2, in which the hollow body is arranged close to the lower edge of the first longitudinal wall or of the second longitudinal wall.

5. The device for manufacturing three-dimensional object according to claim 3, in which two parallel pipes are arranged as hollow bodies.

6. The device for manufacturing three-dimensional object according to claim 4, in which two parallel pipes are arranged as hollow bodies.

7. The device for manufacturing three-dimensional object according to claim 1, further having a closed loop temperature control device, by which the temperature of the application device can be controlled.

8. The device for manufacturing three-dimensional object according to claim 2, further having a closed loop temperature control device, by which the temperature of the application device can be controlled.

9. The device for manufacturing three-dimensional object according to claim 3, further having a closed loop temperature control device, by which the temperature of the application device can be controlled.

10. The device for manufacturing three-dimensional object according to claim 4, further having a closed loop temperature control device, by which the temperature of the application device can be controlled.

11. The device for manufacturing three-dimensional object according to claim 5, further having a closed loop temperature control device, by which the temperature of the application device can be controlled.

12. The device for manufacturing three-dimensional object according to claim 6, further having a closed loop temperature control device, by which the temperature of the application device can be controlled.

13. The device for manufacturing three-dimensional object according to claim 1, wherein the irradiation device effects solidification by means of electromagnetic radiation or particle radiation.

14. A device for manufacturing three-dimensional object by solidification of layers of a powder material at those positions corresponding to the respective cross-section of the object, said device including:

an application device for applying powder in layers, the application device being movable over a building area and having:

a first longitudinal wall and a second longitudinal wall that are connected to one another via side walls so as to form a supply chamber having a longitudinal direction substantially transverse to a direction of movement of the application device, said first and second longitudinal walls being substantially longer than said side walls, a device for fluidizing the powder material by means of a fluidizing gas that is fed to the application device, and a device for an open loop and/or closed loop control of the pressure and/or the flow rate of said fluidizing gas, wherein the device for an open loop and/or closed loop control is configured to adjust the pressure and/or flow rate of the fluidizing gas based on the position of the application device, the device for manufacturing three-dimensional object further comprising:

an irradiation device for irradiating powder for solidification of the powder material, and a dosage device for providing an amount of the powder material for one layer to the device for fluidizing the powder material.

15. The device according to claim 1, wherein the supply chamber extends over the entire building area in a direction transverse to said direction of movement of the application device.

* * * * *